US012567154B2

(12) United States Patent
    Komiya

(10) Patent No.: US 12,567,154 B2
(45) Date of Patent: Mar. 3, 2026

(54) PROCESSING APPARATUS, METHOD, AND MEDIUM FOR HIGH-FREQUENCY SPECIFIC SUBJECT PROCESSING IN IMAGE DATA

(71) Applicant: FUJIFILM Corporation, Tokyo (JP)

(72) Inventor: Yuma Komiya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 364 days.

(21) Appl. No.: 18/344,866

(22) Filed: Jun. 30, 2023

(65) Prior Publication Data

US 2023/0360222 A1      Nov. 9, 2023

Related U.S. Application Data

(63) Continuation of application No. PCT/JP2022/000389, filed on Jan. 7, 2022.

(30) Foreign Application Priority Data

Jan. 15, 2021    (JP) ................................. 2021-005137

(51) Int. Cl.
    *G06T 7/11*          (2017.01)
    *G06T 7/62*          (2017.01)
(52) U.S. Cl.
    CPC .  *G06T 7/11* (2017.01); *G06T 7/62* (2017.01)
(58) Field of Classification Search
    CPC .... G06T 7/11; G06T 7/62; G06T 7/00; H04N 23/61; H04N 23/80; H04N 23/635; G03B 3/10
    See application file for complete search history.

(56) References Cited

U.S. PATENT DOCUMENTS 7,693,256 B2 *   4/2010   Brahme ................. A61B 6/022
                                                          378/62
8,363,122 B2     1/2013   Onozawa
                  (Continued)

FOREIGN PATENT DOCUMENTS

JP        2008288868        11/2008
JP        2010244462        10/2010
                  (Continued)

OTHER PUBLICATIONS

"International Search Report (Form PCT/ISA/210) of PCT/JP2022/000389," mailed on Mar. 8, 2022, with English translation thereof, pp. 1-5.

(Continued)

*Primary Examiner* — Mia M Thomas
(74) *Attorney, Agent, or Firm* — JCIPRNET

(57) ABSTRACT

A processing apparatus includes a processor and a memory. The processor performs first detection processing of detecting a first area of a target to be detected from image data acquired from an imaging element and performs second detection processing of detecting a second area based on the first area from image data acquired from the imaging element. The processor further performs first processing using the first area, and performs second processing using the second area. The processor repeatedly performs the first detection processing, and performs the second detection processing in each period from the detecting of the first area started at a first timing to the detecting of the first area subsequently started after the first timing.

17 Claims, 8 Drawing Sheets

(56) References Cited

U.S. PATENT DOCUMENTS

| | | | | |
|---|---|---|---|---|
| 8,731,367 | B2* | 5/2014 | Sakaguchi | A61B 6/461 |
| | | | | 348/45 |
| 8,878,939 | B2 | 11/2014 | Shimada | |
| 10,342,501 | B2* | 7/2019 | Sakaguchi | A61B 6/5264 |
| 2011/0216166 | A1* | 9/2011 | Takahashi | H04N 13/359 |
| | | | | 348/46 |
| 2017/0301080 | A1* | 10/2017 | Yan | G06T 7/337 |
| 2018/0061052 | A1* | 3/2018 | Bedi | G06T 7/13 |
| 2018/0276835 | A1* | 9/2018 | Amano | G06T 7/564 |
| 2019/0082930 | A1* | 3/2019 | Shimomura | A61B 5/065 |
| 2020/0202128 | A1* | 6/2020 | Liu | H04N 23/61 |
| 2020/0272841 | A1* | 8/2020 | Han | G06N 3/09 |
| 2021/0090261 | A1* | 3/2021 | Sugimoto | G06N 3/09 |
| 2023/0336864 | A1* | 10/2023 | Komiya | G03B 7/093 |
| 2023/0360222 | A1 | 11/2023 | Komiya | |
| 2024/0233139 | A1* | 7/2024 | Komiya | H04N 23/69 |
| 2024/0357233 | A1* | 10/2024 | Komiya | H04N 23/611 |
| 2025/0039534 | A1* | 1/2025 | Komiya | H04N 23/76 |
| 2025/0134483 | A1* | 5/2025 | Paul | A61B 6/5205 |

FOREIGN PATENT DOCUMENTS

| | | |
|---|---|---|
| JP | 2011150594 | 8/2011 |
| JP | 2011258180 | 12/2011 |
| JP | 2014095907 | 5/2014 |
| JP | 2015069064 | 4/2015 |
| JP | 2017026914 | 2/2017 |
| WO | 2022153946 | 7/2022 |

OTHER PUBLICATIONS

"Written Opinion of the International Searching Authority (Form PCT/ISA/237) of PCT/JP2022/000389," mailed on Mar. 8, 2022, with English translation thereof, pp. 1-8.

"Office Action of Japan Counterpart Application", issued on Oct. 29, 2024, with English translation thereof, p. 1-p. 8.

"Office Action of Japan Counterpart Application", issued on May 7, 2025, with English translation thereof, p. 1-p. 5.

* cited by examiner

FIG. 2

PROCESSING APPARATUS, METHOD, AND MEDIUM FOR HIGH-FREQUENCY SPECIFIC SUBJECT PROCESSING IN IMAGE DATA

CROSS REFERENCE TO RELATED APPLICATION

This is a continuation of International Application No. PCT/JP2022/000389 filed on Jan. 7, 2022, and claims priority from Japanese Patent Application No. 2021-005137 filed on Jan. 15, 2021, the entire disclosures of which are incorporated herein by reference.

BACKGROUND OF THE INVENTION

1. Field of the Invention

The present invention relates to a processing apparatus, a processing method, and a computer readable medium storing a processing program.

2. Description of the Related Art

JP2015-69064A discloses an imaging apparatus comprising a subject detection unit that, using image data on which resolution conversion processing is performed, detects a subject included in an image based on the image data in an initial frame in which a subject tracking operation is started, and a subject tracking unit that detects the subject from a frame subsequent to the initial frame by executing template matching processing using subject image data generated by the subject detection unit in the initial frame and the image data on which the resolution conversion processing is performed.

JP2011-150594A discloses an image processing apparatus that detects a subject as a target to be tracked using different tracking methods depending on whether or not an input image is flat.

JP2011-258180A discloses an imaging apparatus comprising an image division unit that divides image data of a subject stored in a memory into a plurality of regions, a region specifying unit that, based on a feature of each of the plurality of divided regions, individually specifies a corresponding region corresponding to each region from image frames sequentially generated by an imaging unit, and a subject tracking unit that, based on the specified corresponding region, tracks an image region having the corresponding region in the image frames as a target to be tracked.

JP2014-95907A discloses an image tracking apparatus that tracks a target by repeatedly detecting a pattern corresponding to a specific target from a plurality of repeatedly obtained images, sets at least one of a color or brightness of the target as standard information, tracks an image of the target by repeatedly detecting the image of the target from the plurality of images based on the standard information, and performs a control to change to tracking of the image of the target in a case where tracking of the target is not available after tracking of the target is started.

JP2017-26914A discloses an optical apparatus including a detection unit that detects an image region corresponding to a subject in each of a plurality of images sequentially generated by performing photoelectric conversion on an optical image of the subject formed by an imaging optical system, and a control unit that performs a focus tracking control based on the image region such that a focusing state of the imaging optical system on the subject is maintained, in which the control unit, in response to a change of the subject from a first subject to a second subject different from the first subject in the image region, transitions from the focus tracking control of the first subject to the focus tracking control of the second subject and performs the focus tracking control of the second subject only in a case where a defocus state of the imaging optical system with respect to the first subject satisfies a predetermined condition.

SUMMARY OF THE INVENTION

An object of the present invention is to provide a processing apparatus, a processing method, and a computer readable medium storing a processing program that can perform processing corresponding to a detected specific subject with high frequency by improving a detection frequency of the specific subject included in image data.

A processing apparatus according to an aspect of the present invention is a processing apparatus comprising a processor, and a memory, in which the processor is configured to perform first detection processing of detecting a first area of a target to be detected from image data acquired from an imaging element, second detection processing of detecting a second area based on the first area from image data acquired from the imaging element, first processing using the first area detected by the first detection processing, and second processing using the second area detected by the second detection processing, and the processor is configured to repeatedly perform the first detection processing, and perform the second detection processing in each period from the detecting of the first area by the first detection processing started at a first timing to the detecting of the first area by the first detection processing subsequently started after the first timing.

A processing method according to another aspect of the present invention comprises performing first detection processing of detecting a first area of a target to be detected from image data acquired from an imaging element, second detection processing of detecting a second area based on the first area from image data acquired from the imaging element, first processing using the first area detected by the first detection processing, and second processing using the second area detected by the second detection processing, wherein the first detection processing is repeatedly performed and the second detection processing is performed in each period from the detecting of the first area by the first detection processing started at a first timing to the detecting of the first area by the first detection processing subsequently started after the first timing.

A processing program, which is stored in a computer readable medium, according to still another aspect of the present invention causes a processor to execute first detection processing of detecting a first area of a target to be detected from image data acquired from an imaging element, second detection processing of detecting a second area based on the first area from image data acquired from the imaging element, first processing using the first area detected by the first detection processing, and second processing using the second area detected by the second detection processing, wherein the processor is caused to repeatedly perform the first detection processing and perform the second detection processing in each period from the detecting of the first area by the first detection processing started at a first timing to the detecting of the first area by the first detection processing subsequently started after the first timing.

According to the present invention, processing corresponding to a detected specific subject can be performed with high frequency by improving a detection frequency of the specific subject included in image data.

BRIEF DESCRIPTION OF THE DRAWINGS

FIG. 2 is a timing chart for describing a first example of operation of the digital camera 100 illustrated in FIG. 1 during live view image display.

DESCRIPTION OF THE PREFERRED EMBODIMENTS

Hereinafter, an embodiment of the present invention will be described with reference to the drawings.

Figure 1:
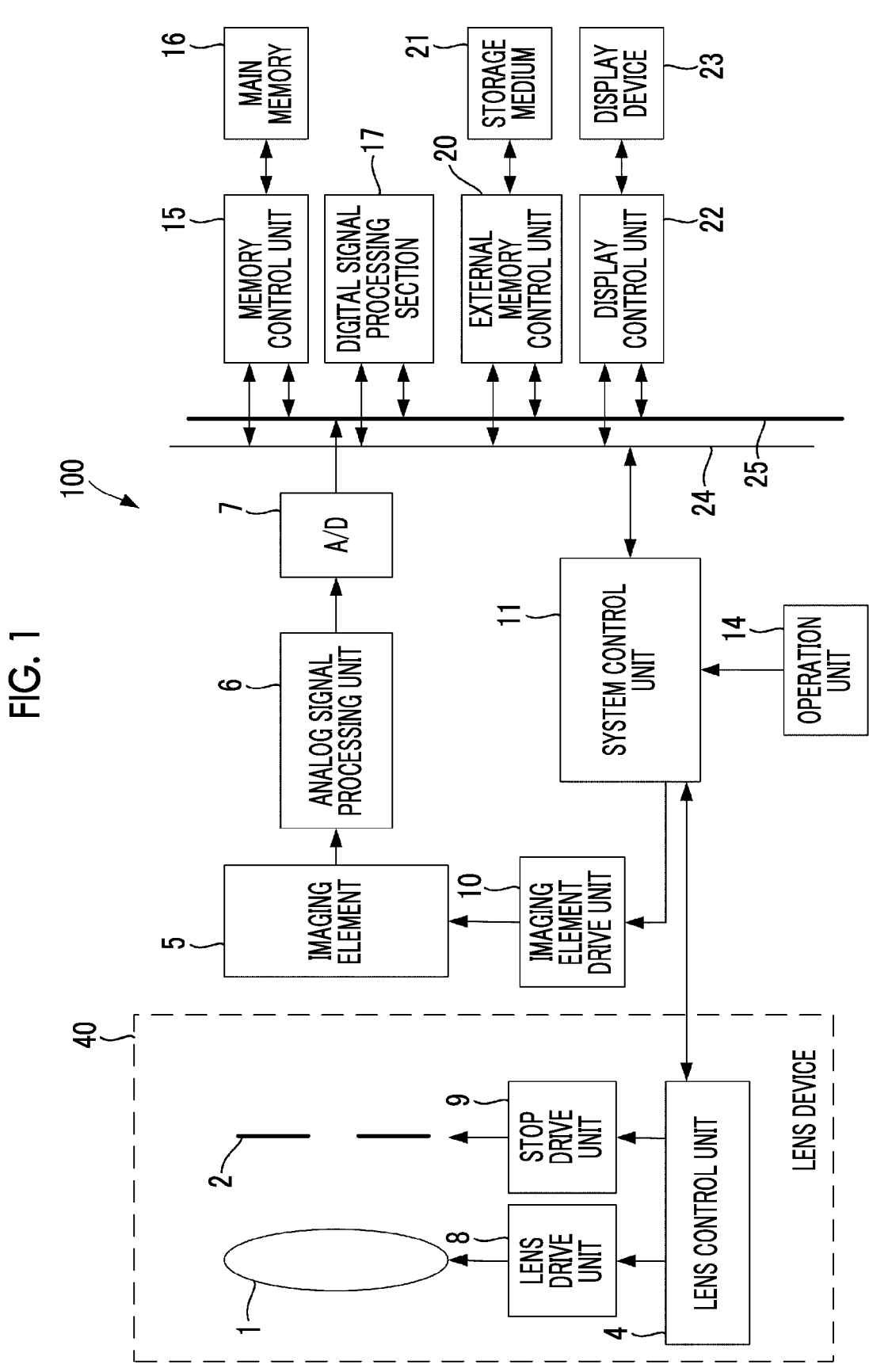
FIG. 1 is a diagram illustrating a schematic configuration of a digital camera 100 that is an embodiment of a processing apparatus according to the present invention.

FIG. 1 is a diagram illustrating a schematic configuration of a digital camera 100 that is an embodiment of a processing apparatus according to the present invention.

The digital camera 100 illustrated in FIG. 1 comprises a lens device 40 including an imaging lens 1, a stop 2, a lens control unit 4, a lens drive unit 8, and a stop drive unit 9.

The lens device 40 may be attachable to and detachable from a body of the digital camera 100 or may be integrated with the body of the digital camera 100.

The imaging lens 1 and the stop 2 constitute an imaging optical system, and the imaging optical system includes a focus lens that can move in an optical axis direction. The focus lens is a lens for adjusting a focus of the imaging optical system and is composed of a single lens or of a plurality of lenses. By moving the focus lens in the optical axis direction, a position of a principal point of the focus lens changes along the optical axis direction, and a focal position on a subject side is changed. A liquid lens of which a position of a principal point in the optical axis direction can be changed by electrical control may be used as the focus lens.

The lens control unit 4 of the lens device 40 is configured to communicate with a system control unit 11 in the body of the digital camera 100 in a wired or wireless manner. The lens control unit 4, in accordance with instructions from the system control unit 11, changes the position of the principal point of the focus lens (focus control) by driving the focus lens included in the imaging lens 1 through the lens drive unit 8 or controls an opening amount of the stop 2 through the stop drive unit 9.

The body of the digital camera 100 comprises an imaging element 5 such as a charge coupled device (CCD) type image sensor or a complementary metal oxide semiconductor (CMOS) type image sensor that images a subject through the imaging optical system, an analog signal processing unit 6 that is connected to the imaging element 5 and that performs analog signal processing such as correlative double sampling processing, an analog-to-digital conversion circuit 7 that converts an analog signal output from the analog signal processing unit 6 into a digital signal, an imaging element drive unit 10, the system control unit 11 that manages and controls the entire digital camera 100, and an operation unit 14.

The analog signal processing unit 6, the analog-to-digital conversion circuit 7, and the imaging element drive unit 10 are controlled by the system control unit 11. The analog signal processing unit 6 and the analog-to-digital conversion circuit 7 may be incorporated in the imaging element 5.

The imaging element 5 includes an imaging surface on which a plurality of pixels are two-dimensionally disposed, converts a subject image formed on the imaging surface by the imaging optical system into electric signals (pixel signals) via the plurality of pixels, and outputs the electric signals.

The system control unit 11 drives the imaging element 5 through the imaging element drive unit 10 and outputs a subject image captured through the imaging optical system as a captured image signal (a set of pixel signals). Command signals from a user are input into the system control unit 11 through the operation unit 14.

The system control unit 11 comprises a processor, a random access memory (RAM), and a read only memory (ROM) such as a flash memory.

The system control unit 11 implements each function, described later, by executing programs including a processing program stored in the incorporated flash memory via the processor. Examples of the processors include a central processing unit (CPU) that is a general-purpose processor performing various types of processing by executing a program, a programmable logic device (PLD) such as a field programmable gate array (FPGA) that is a processor of which a circuit configuration can be changed after manufacture, or a dedicated electric circuit such as an application specific integrated circuit (ASIC) that is a processor having a circuit configuration dedicatedly designed to execute specific processing. More specifically, the processors have a structure of an electric circuit in which circuit elements such as semiconductor elements are combined. The system control unit 11 may be configured with one of the processors or may be configured with a combination of two or more processors of the same type or of different types (for example, a combination of a plurality of FPGAs or a combination of a CPU and an FPGA).

Furthermore, an electric control system of the digital camera 100 comprises a main memory 16, a memory control unit 15 that controls data storage in the main memory 16 and data readout from the main memory 16, a digital signal processing section 17 that generates image data in accordance with various formats such as the Joint Photographic Experts Group (JPEG) format by performing digital signal processing on the captured image signal output from the analog-to-digital conversion circuit 7, an external memory control unit 20 that controls data storage in a storage medium 21 and data readout from the storage medium 21, a display device 23 composed of an organic electroluminescence (EL) device, a liquid crystal display, or the like, and a display control unit 22 that controls display of the display device 23. The display device 23 is mounted on a surface on a rear surface side of the body of the digital camera 100. The display device 23 may be incorporated in the body of the digital camera 100 and be observable from an eyepiece window provided in the body of the digital camera 100. The digital camera 100 may be provided with the display device 23 mounted on the surface on the rear surface side of the body and with the display device 23 incorporated in the body.

The storage medium 21 is a semiconductor memory such as a flash memory incorporated in the digital camera 100, a portable semiconductor memory that is attachable to and detachable from the digital camera 100, or the like. However, the storage medium 21 is not limited thereto, and a storage device of a personal computer (PC) or the like connected through wired communication or through wireless communication may be used.

The memory control unit 15, the digital signal processing section 17, the external memory control unit 20, and the display control unit 22 are connected to each other through a control bus 24 and through a data bus 25 and are controlled in accordance with instructions from the system control unit 11.

The digital camera 100 has a static image mode in which still images are stored in the storage medium 21, and a video mode in which a video image is stored in the storage medium 21. In any of the modes, a live view image of the subject being imaged is displayed on the display device 23. In a case of displaying the live view image on the display device 23, the digital camera 100 performs a control of detecting an area of a main subject from the image data generated by the digital signal processing section 17 and of displaying a detection frame image (for example, an image of a rectangular frame) indicating the detected area of the main subject in a superimposed manner on the live view image. In addition, the digital camera 100 performs the focus control, an exposure control, or a white balance control based on the detected area of the main subject. The main subject includes a face of a person, a face of an animal, a vehicle, and the like.

Detection processing of the main subject is performed by the system control unit 11. The system control unit 11 selectively performs subject detection processing constituting first detection processing and tracking processing constituting second detection processing as the detection processing of the main subject.

The subject detection processing is processing of detecting an area of a target to be detected (a first area) as the area of the main subject from the image data (hereinafter, referred to as detection image data) that is output from the imaging element 5 and that is obtained by performing digital signal processing thereon, based on an image recognition algorithm or the like generated using machine learning. The target to be detected is the same as the main subject and includes a face of a person, a face of an animal, a vehicle, and the like.

The tracking processing is processing of detecting a second area based on the first area detected by the subject detection processing from the detection image data as the area of the main subject. Specifically, the system control unit 11 stores an image of the first area detected by the subject detection processing in the memory as a standard image, searches for a similar area similar to the standard image from the detection image data, and detects the searched similar area as the second area.

During live view image display, the system control unit 11 continuously performs the subject detection processing and performs the tracking processing in each period from detection of the first area by the subject detection processing started at a first timing to detection of the first area by the subject detection processing subsequently started after the first timing.

A frequency with which the subject detection processing is performed is determined based on a time required for the subject detection processing (a time from the start of the subject detection processing to obtaining of a detection result). While the time required for the subject detection processing may change depending on conditions such as content of the detection image data and a processing load of the system control unit 11, a representative value (a median value, an average value, or the like) thereof is determined. In the present specification, this representative value is defined as the time required for the subject detection processing. In the digital camera 100, the time required for the subject detection processing is longer than an interval of imaging (a period of a vertical synchronization signal (hereinafter, referred to as a frame period)) performed by the imaging element 5 during the live view image display. Thus, a period of the subject detection processing is set to be greater than or equal to double the frame period. That is, the subject detection processing is performed with a frequency of once for a plurality of times of imaging.

A processing result of the tracking processing can be obtained faster than that of the subject detection processing. That is, a time required for the tracking processing (a time from the start of the tracking processing to obtaining of a detection result) is shorter than the time required for the subject detection processing. While the time required for the tracking processing may change depending on conditions such as the processing load of the system control unit 11, a representative value (a median value, an average value, or the like) thereof is determined. In the present specification, this representative value is defined as the time required for the tracking processing.

Figure 2:
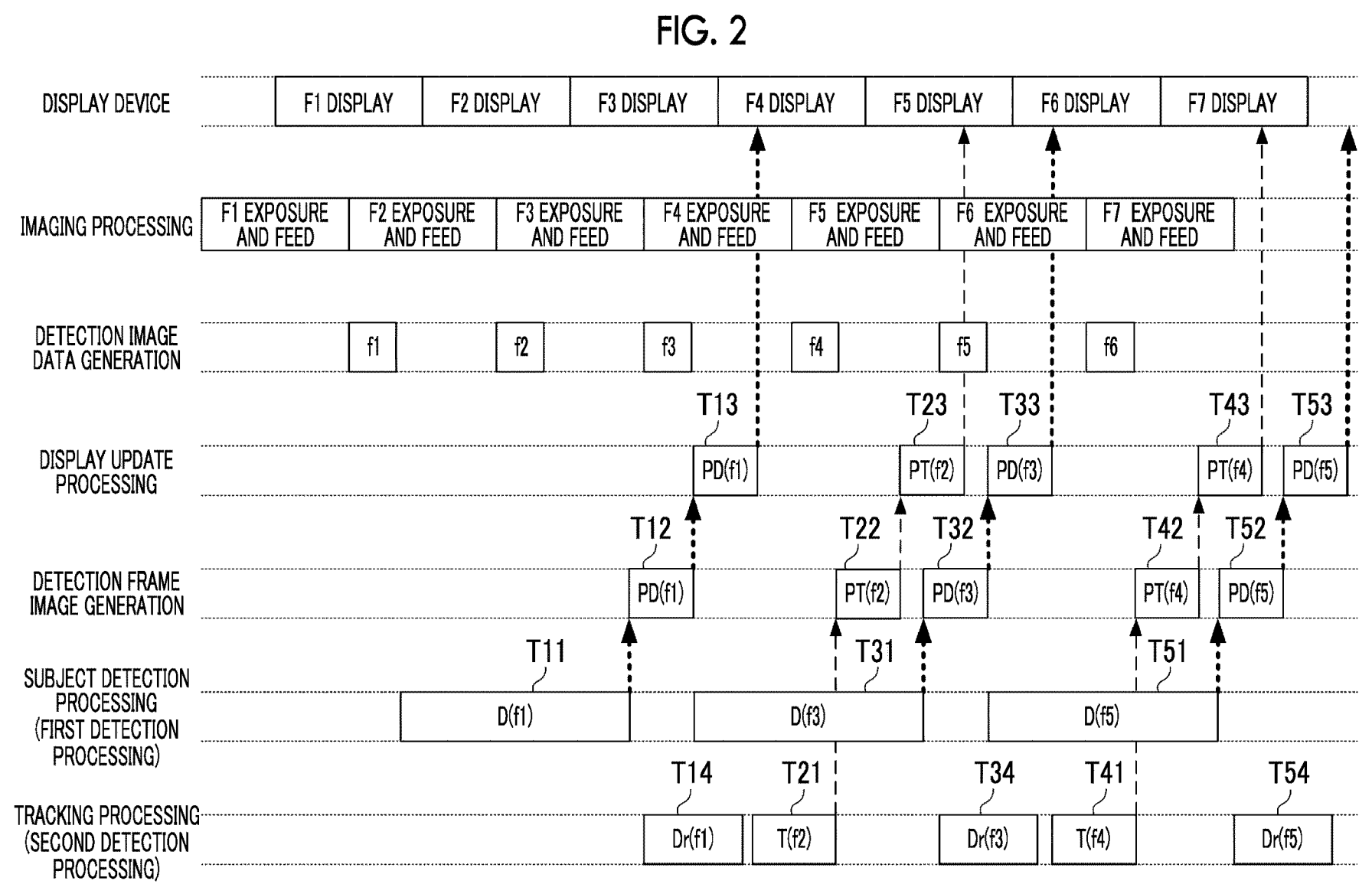

Hereinafter, operation of the digital camera 100 during the live view image display will be described with reference to timing charts. FIG. 2 is a timing chart for describing a first example of the operation of the digital camera 100 illustrated in FIG. 1 during the live view image display.

In the chart of "imaging processing" in FIG. 2, a period marked with "F# exposure and feed (# is 1 to 7)" shows a period in which exposure of the imaging element 5 in a #-th frame (e.g., in a case where # is 1, "#-th frame" means a first frame) is performed and in which the pixel signals generated by the exposure are output from the imaging element 5 and fed into the digital signal processing section 17. A length of this period corresponds to a frame interval.

In the chart of "display device" in FIG. 2, a period marked with "F# display" shows a period in which the live view image obtained by processing the pixel signals output from the imaging element 5 in the period of "F# exposure and feed" is displayed on the display device 23.

In the chart of "detection image data generation" in FIG. 2, a period marked with "f#" shows a period in which detection image data f# is generated by processing the captured image signal output from the imaging element 5 in the period of "F#exposure and feed".

In a case where exposure in the first frame is started and where readout of the pixel signals is started by ending the exposure, live view image data is sequentially generated by the digital signal processing section 17, and the generated live view image data is displayed on the display device 23. In a case where readout of all pixel signals based on the exposure is completed, the detection image data f1 is generated by the digital signal processing section 17, and the detection image data f1 is acquired by the system control unit 11. Such operation is repeated in the second frame and later.

In a case where the detection image data f1 is acquired, the system control unit 11 starts the subject detection processing of detecting the target to be detected from the detection image data f1 as shown in period T11. As described above, the time required for the subject detection processing is longer than the frame interval. Thus, the subsequent detection image data f2 is acquired by the system control unit 11 before period T11 ends.

In a case where the area of the target to be detected is detected from the detection image data f1, the system control unit 11 generates a detection frame image PD(f1) indicating the area in period T12 and performs processing of displaying the generated detection frame image PD(f1) on the display device 23 in subsequent period T13. By performing this processing, the detection frame image PD(f1) is displayed in a superimposed manner on the live view image generated by imaging processing in the fourth frame.

In addition, in a case where the area of the target to be detected is detected from the detection image data f1, the system control unit 11 stores an image Dr(f1) of the area in the memory in period T14 as the standard image. In a case where the standard image in the past is stored in the memory, the system control unit 11 updates the standard image by overwriting the standard image in the past with the image Dr(f1). Next, the system control unit 11 performs the tracking processing of searching for the similar area similar to the standard image from the detection image data f2 in period T21. While illustration is not provided, after the end of period T11, the system control unit 11 performs the focus control, the exposure control, or the white balance control based on the image Dr(f1) of the area of the target to be detected from the detection image data f1.

In a case where the similar area similar to the standard image is detected from the detection image data f2 in period T21, the system control unit 11 overwrites the standard image with an image of the similar area in the memory and furthermore, generates a detection frame image PT(f2) indicating the similar area in period T22. Next, the system control unit 11 performs processing of displaying the generated detection frame image PT(f2) on the display device 23 in period T23. By performing this processing, the detection frame image PT(f2) is displayed in a superimposed manner on the live view image generated by imaging processing in the fifth frame.

Then, the system control unit 11 repeats the same processing.

That is, in a case where the detection image data f3 is acquired, the system control unit 11 starts the subject detection processing of detecting the target to be detected from the detection image data f3 (period T31), in a case where the area of the target to be detected is detected from the detection image data f3, generates a detection frame image PD(f3) indicating the area (period T32), and performs processing of displaying the generated detection frame image PD(f3) on the display device 23 (period T33).

In addition, in a case where the area of the target to be detected is detected from the detection image data f3 in period T31, the system control unit 11 stores an image Dr(f3) of the area in the memory as the standard image (period T34). Next, the system control unit 11 performs the tracking processing of searching for the similar area similar to the standard image from the detection image data f4 (period T41). In a case where the similar area similar to the standard image is detected from the detection image data f4, the system control unit 11 overwrites the standard image with the image of the similar area in the memory and furthermore, generates a detection frame image PT(f4) indicating the similar area (period T42) and performs processing of displaying the generated detection frame image PT(f4) on the display device 23 (period T43).

In a case where the detection image data f5 is acquired, the system control unit 11 starts the subject detection processing of detecting the target to be detected from the detection image data f5 (period T51), in a case where the area of the target to be detected is detected from the detection image data f5, generates a detection frame image PD(f5) indicating the area (period T52), and performs processing of displaying the generated detection frame image PD(f5) on the display device 23 (period T53). In addition, in a case where the area of the target to be detected is detected from the detection image data f5, the system control unit 11 stores an image Dr(f5) of the area in the memory as the standard image (period T54).

By performing the above operation, the detection frame image indicating a position of the main subject superimposed on the live view image is updated for each frame of display after the live view image in the fourth frame is displayed.

Figure 3:
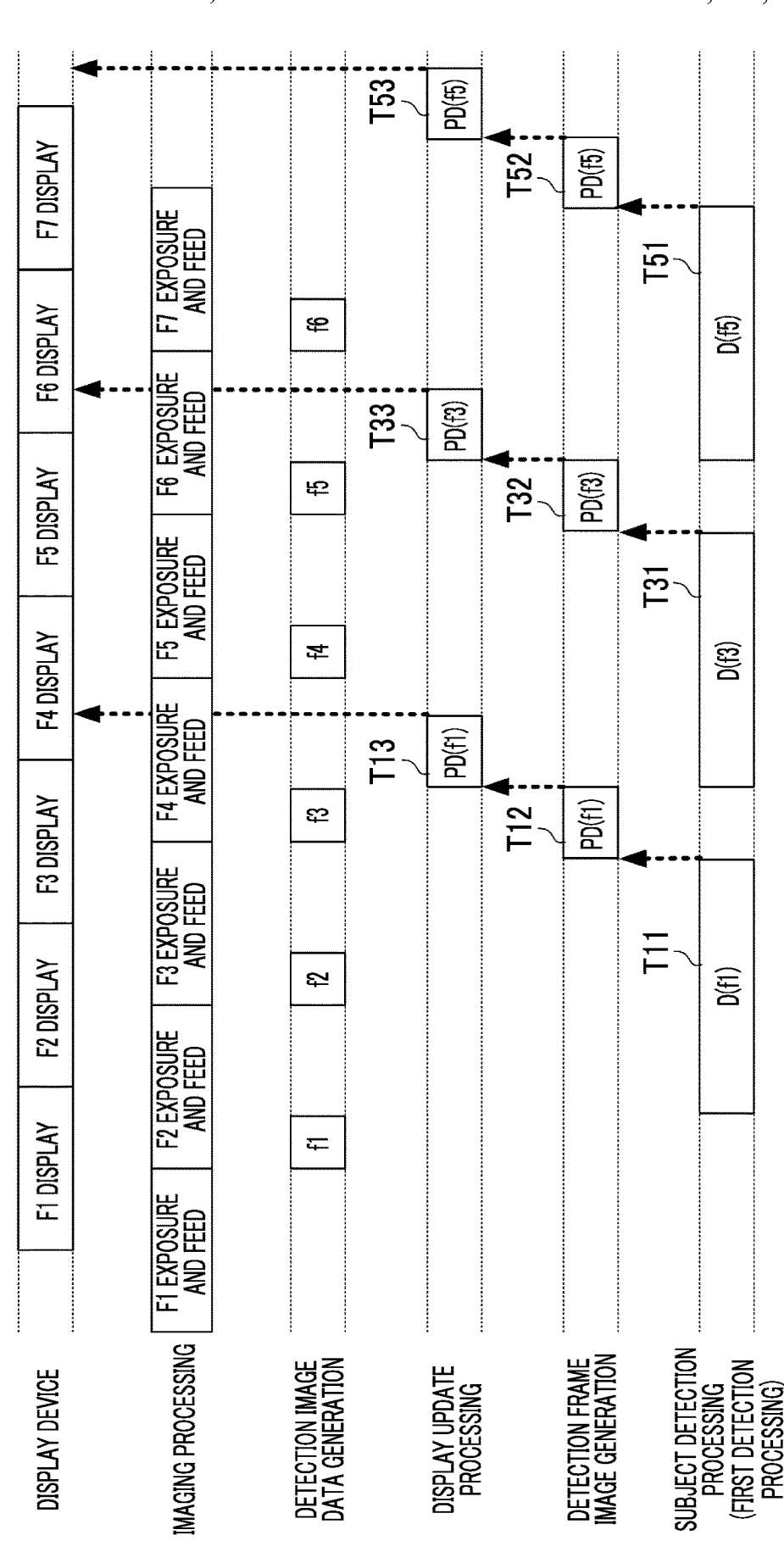
FIG. 3 is a timing chart for describing operation of a digital camera of a reference example during the live view image display.

FIG. 3 is a timing chart for describing operation of a digital camera of a reference example. The digital camera of the reference example has the same configuration as the digital camera 100, and only functions of the system control unit 11 are different. The system control unit 11 of the digital camera of the reference example does not perform the tracking processing and performs only the subject detection processing as the detection processing of the main subject. In FIG. 3, period T14, period T21 to period T23, period T34, period T41 to period T43, and period T54 in FIG. 2 are removed.

In the operation of the digital camera of the reference example, the time required for the subject detection processing is longer than the frame interval. Thus, the detection frame image is updated with a frequency of once for every two frames of display. In addition, the main subject cannot be detected from the detection image data f2, f4, and f6, and it is difficult to quickly deal with a change of the subject.

On the other hand, in the digital camera 100, the tracking processing is performed between continuous executions of the subject detection processing (a period from the end of period T11 to the end of period T31 and a period from the end of period T31 to the end of period T51), and the detection frame image is updated using the result of the tracking processing. Thus, the update of the detection frame image and the focus control and the like based on the main subject can be performed with high frequency, and it is possible to improve quality of the live view image and to improve quality of imaging. In addition, since the main subject can be detected from the detection image data f2, f4, and f6, it is possible to quickly deal with a change of the subject, and the quality of imaging can be improved.

Figure 4:
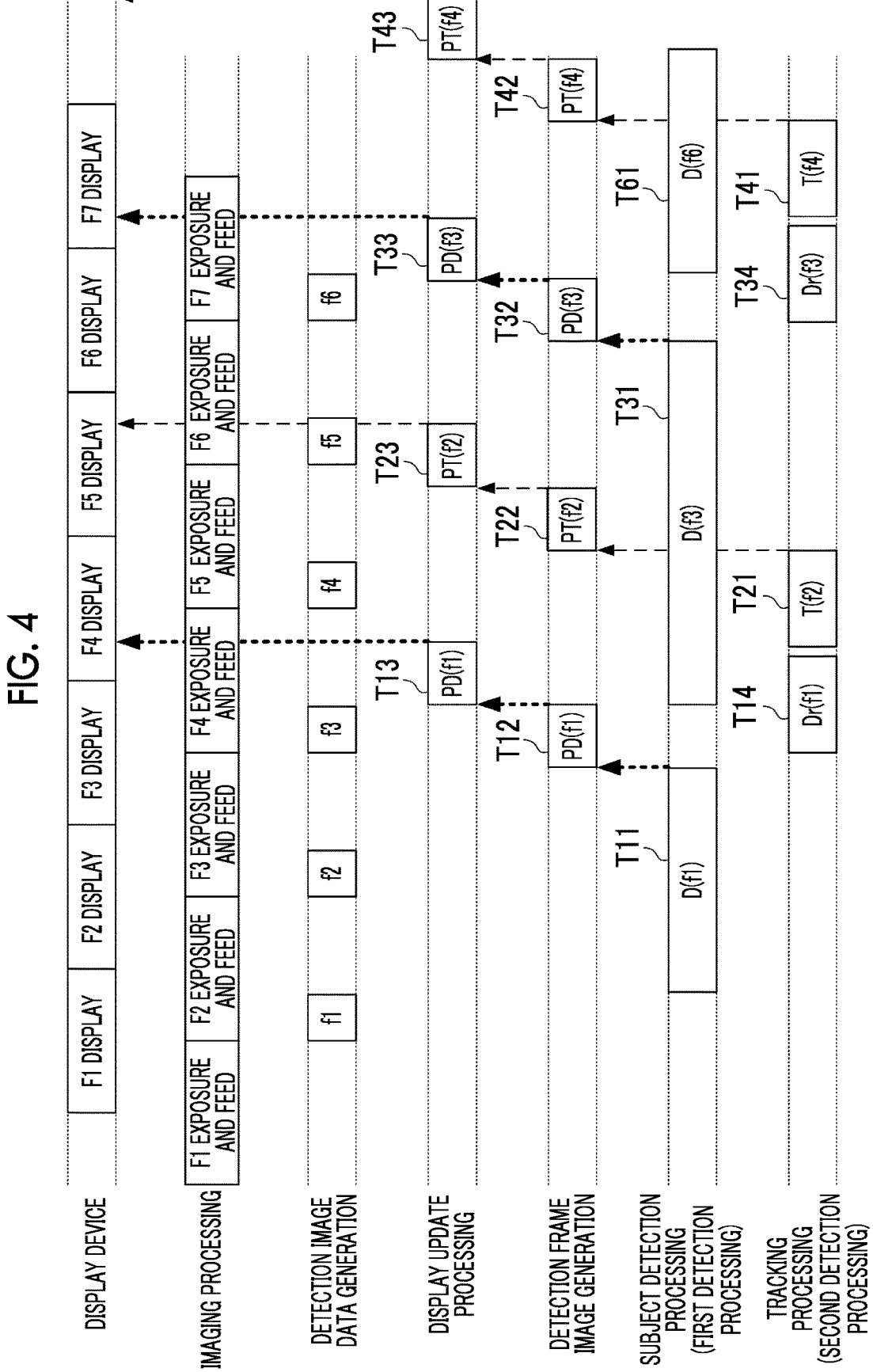
FIG. 4 is a timing chart for describing a second example of the operation of the digital camera 100 illustrated in FIG. 1 during the live view image display.

FIG. 4 is a timing chart for describing a second example of the operation of the digital camera 100 illustrated in FIG. 1 during the live view image display. In FIG. 4, a first difference from FIG. 2 is that it takes time to perform the subject detection processing in period T31 and that period T31 is lengthened. In addition, a second difference from FIG. 2 is that the subject detection processing with respect to the detection image data f5 is not performed and that the subject detection processing with respect to the detection image data f6 is performed in period T61 after the subject detection processing in period T31.

In the operation in FIG. 4, the standard image is updated in period T21. Thus, before period T31 ends, the tracking processing with respect to the detection image data f4 using the standard image and the update of the detection frame image (the update of the detection frame image in the period of "F6 display") based on the result of the tracking processing can be performed. However, in the digital camera 100, the subsequent tracking processing does not start until period T31 ends. Accordingly, the detection frame image generated based on the main subject detected from the detection image data f4 can be prevented from being displayed on the display device 23 before the detection frame image generated based on the main subject detected from the detection image data f3.

After the end of period T31, the standard image is updated in period T34, and the tracking processing of searching for the similar area similar to the standard image from the detection image data f4 is performed in subsequent period T41. The detection frame image based on the result of the tracking processing is displayed in a superimposed on the live view image in the eighth frame. Then, the detection frame image based on the main subject detected in period T61 is displayed. As described above, even in a case where the time of the subject detection processing is lengthened, performing the tracking processing in a period form the end of the subject detection processing to the end of the subsequent subject detection processing can prevent the order of the detection image data as a base of the detection frame image from being inverted, the quality of the live view image can be improved.

Figure 5:
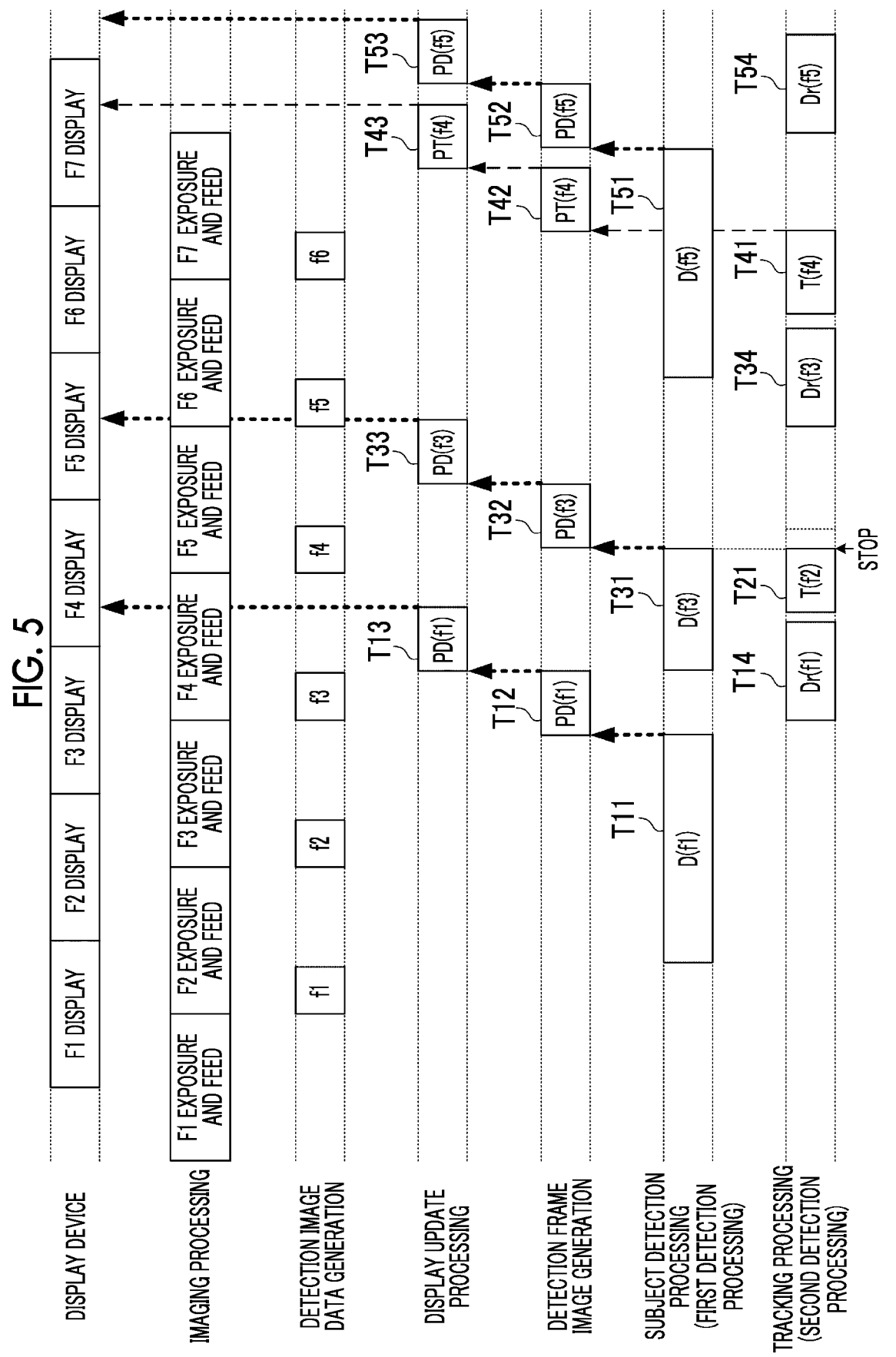
FIG. 5 is a timing chart for describing a third example of the operation of the digital camera 100 illustrated in FIG. 1 during the live view image display.

FIG. 5 is a timing chart for describing a third example of the operation of the digital camera 100 illustrated in FIG. 1 during the live view image display. While the above example in FIG. 4 illustrates a case where period T31 is lengthened from that in FIG. 2, the example in FIG. 5 illustrates a case where period T31 is shortened from that in FIG. 2.

In the example in FIG. 5, the subject detection processing performed in period T31 ends before the end of the tracking processing performed in period T21. In such a case, the system control unit 11 ends (stops) the tracking processing that is being performed in period T21. Accordingly, processing such as display processing of the detection frame image based on the result of the tracking processing and the focus control is caused to not operate. Accordingly, the detection frame image generated based on the main subject detected from the detection image data f2 can be prevented from being displayed on the display device 23 after the detection frame image generated based on the main subject detected from the detection image data f3.

Figure 6:
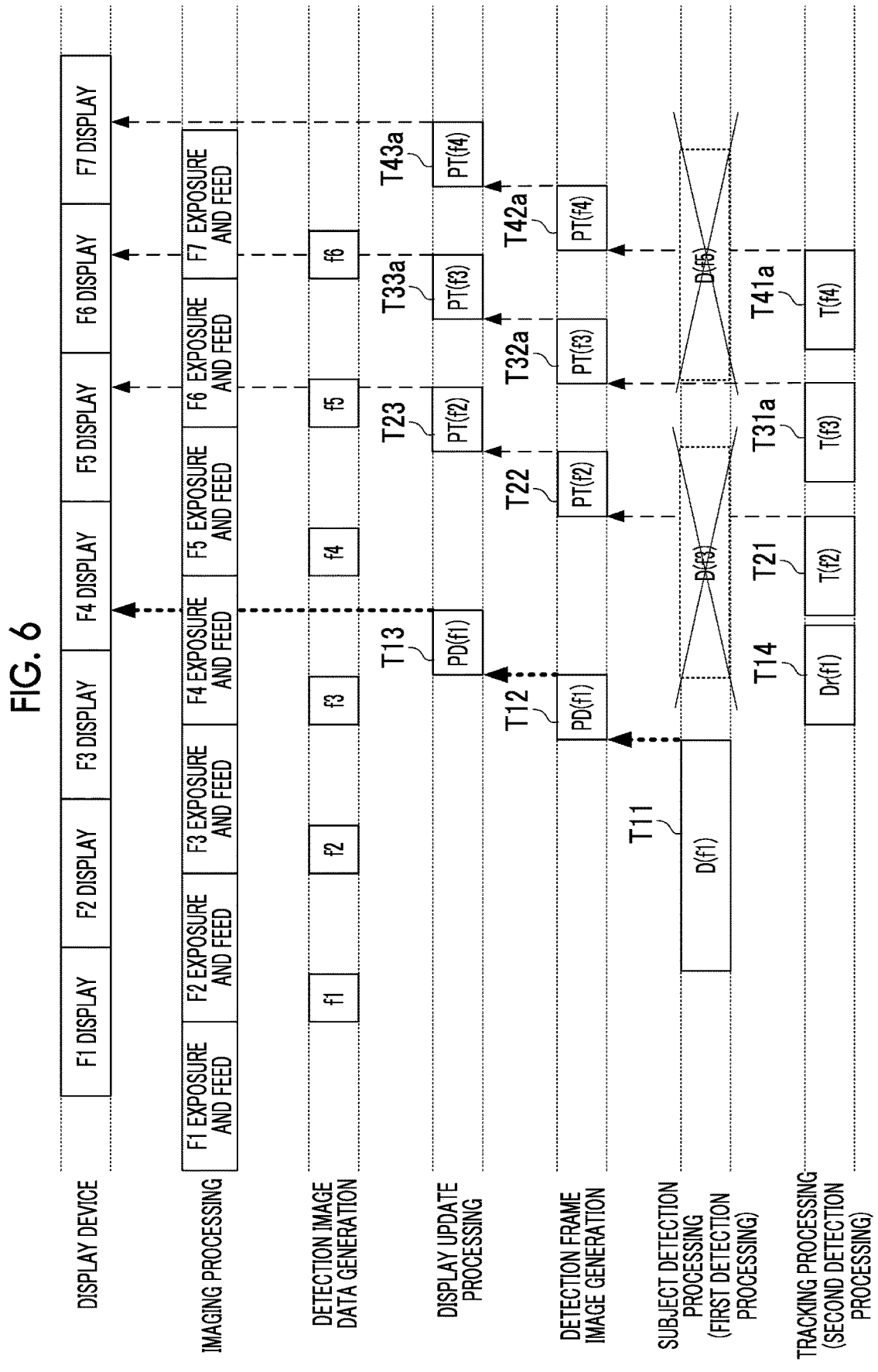
FIG. 6 is a timing chart for describing a fourth example of the operation of the digital camera 100 illustrated in FIG. 1 during the live view image display.

FIG. 6 is a timing chart for describing a fourth example of the operation of the digital camera 100 illustrated in FIG. 1 during the live view image display. The example in FIG. 6 illustrates operation in a case where the subject detection processing from the second execution thereof (processing in period T31 and in period T51 in FIG. 2) cannot be executed because of the processing load of the system control unit 11 or the like, compared to the operation in FIG. 2.

In the operation in FIG. 6, after the end of period T21, the system control unit 11, in period T31a, searches for the similar area similar to the standard image (an image of the main subject detected by the tracking processing in period T21) from the detection image data f3 and, in a case where the similar area is detected, overwrites the standard image with the image of the similar area in the memory. Next, the system control unit 11 generates a detection frame image PT(f3) indicating the similar area in period T32a. Next, the system control unit 11 performs processing of displaying the generated detection frame image PT(f3) on the display device 23 in period T33a. By performing this processing, the detection frame image PT(f3) is displayed in a superimposed manner on the live view image generated by imaging processing in the sixth frame.

In period T41a after period T31a, the system control unit 11 searches for the similar area similar to the standard image (the image of the main subject detected by the tracking processing in period T31a) from the detection image data f4 and, in a case where the similar area is detected, overwrites the standard image with the image of the similar area in the memory. Next, the system control unit 11 generates a detection frame image PT(f4) indicating the similar area in period T42a. Next, the system control unit 11 performs processing of displaying the generated detection frame image PT(f4) on the display device 23 in period T43a. By performing this processing, the detection frame image PT(f4) is displayed in a superimposed manner on the live view image generated by imaging processing in the seventh frame.

As described above, in the operation in FIG. 6, the detection frame images PT(f2), PT(f3), PT(f4), . . . based on the result of the tracking processing are sequentially displayed after the detection frame image PD(f1) based on the result of the subject detection processing is displayed. Accordingly, even in a case where the subject detection processing does not operate for any reason, the update of the detection frame image and the like can be performed by detecting the main subject with high frequency.

As illustrated in FIG. 6, in a case where the subject detection processing cannot be performed and where the tracking processing is continuously performed, it is preferable that the system control unit 11 determines a reliability degree of the area of the main subject detected by each tracking processing and in a case where the reliability degree is greater than or equal to a threshold value, perform processing using the area (the update of the detection frame image, the focus control, the exposure control, the white balance control, and the like). For example, a degree of similarity to the standard image can be used as the reliability degree. By doing so, the detection frame image can be prevented from being superimposed on a subject different from the main subject detected by the subject detection processing.

In the description so far, the detection frame image is generated from the latest area of the main subject detected by the subject detection processing and by the tracking processing. However, it is preferable that the detection frame image is generated using the detection frame image generated in the past and the detection frame image generated from the latest area of the main subject.

In description of the example in FIG. 2, the system control unit 11, for example, generates the detection frame image obtained by averaging the detection frame image PT(f2) and the detection frame image PD(f1) in period T22 and performs processing of displaying the detection frame image in period T23.

In addition, the system control unit 11 generates the detection frame image obtained by averaging the detection frame image PD(f3), the detection frame image PT(f2), and the detection frame image PD(f1) in period T32 and performs processing of displaying the detection frame image in period T33.

In addition, the system control unit 11 generates the detection frame image obtained by averaging the detection frame image PT(f4), the detection frame image PD(f3), and the detection frame image PT(f2) in period T42 and performs processing of displaying the detection frame image in period T43.

As described above, by generating the detection frame image based on information about the area of the main subject detected from the detection image data of a plurality of frames in the past, a slight change in a display position of the detection frame image can be prevented, and the quality of the live view image can be improved. By collectively using the result of the subject detection processing and the result of the tracking processing to generate the detection frame image, processing can be simplified, compared to that in a case where the detection frame image is generated using only the result of the subject detection processing or in a case where the detection frame image is generated using only the result of the tracking processing.

An example of executing the subject detection processing and the tracking processing in combination during the live view image display has been described so far. However, for example, even in a case of reproducing video data stored in the storage medium 21 on the display device 23, it is possible to update the detection frame image with high frequency or to update white balance with high frequency by executing the subject detection processing and the tracking processing in combination. In addition, the present invention is not limited to during the live view image display. By executing the subject detection processing and the tracking processing in combination during video imaging, an imaging condition can be optimized in accordance with the main subject.

Next, a configuration of a smartphone will be described as another embodiment of the processing apparatus according to the present invention.

Figure 7:
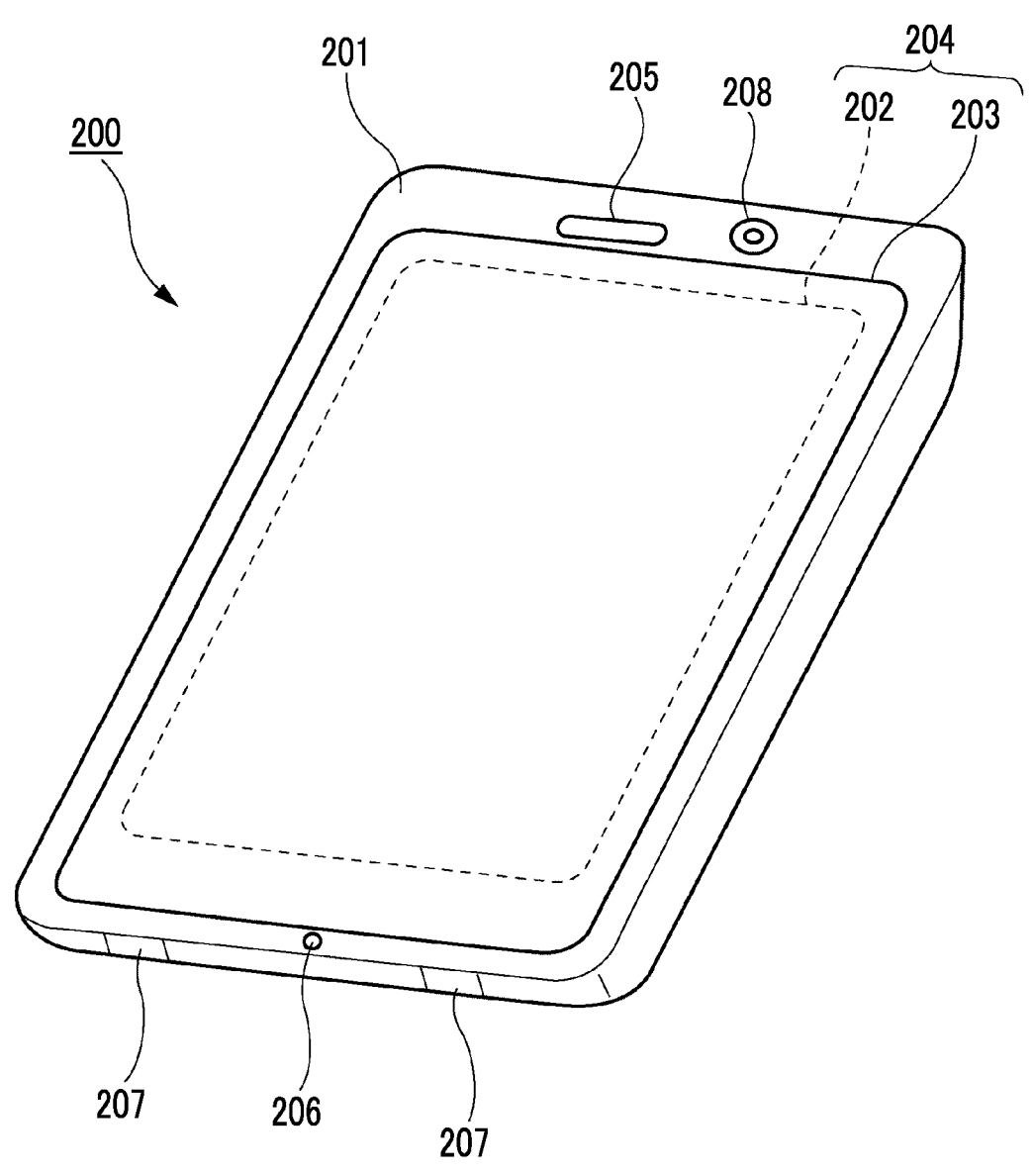
FIG. 7 illustrates an exterior of a smartphone 200 that is another embodiment of the processing apparatus according to the present invention.

FIG. 7 illustrates an exterior of a smartphone 200. The smartphone 200 illustrated in FIG. 7 includes a casing 201 having a flat plate shape and comprises a display and input unit 204 in which a display panel 202 as a display unit and an operation panel 203 as an input unit are integrated on one surface of the casing 201.

In addition, the casing 201 comprises a speaker 205, a microphone 206, an operation unit 207, and a camera unit 208. The configuration of the casing 201 is not limited thereto and can employ, for example, a configuration in which the display unit and the input unit are independently disposed, or a configuration that has a folded structure or a sliding mechanism.

Figure 8:
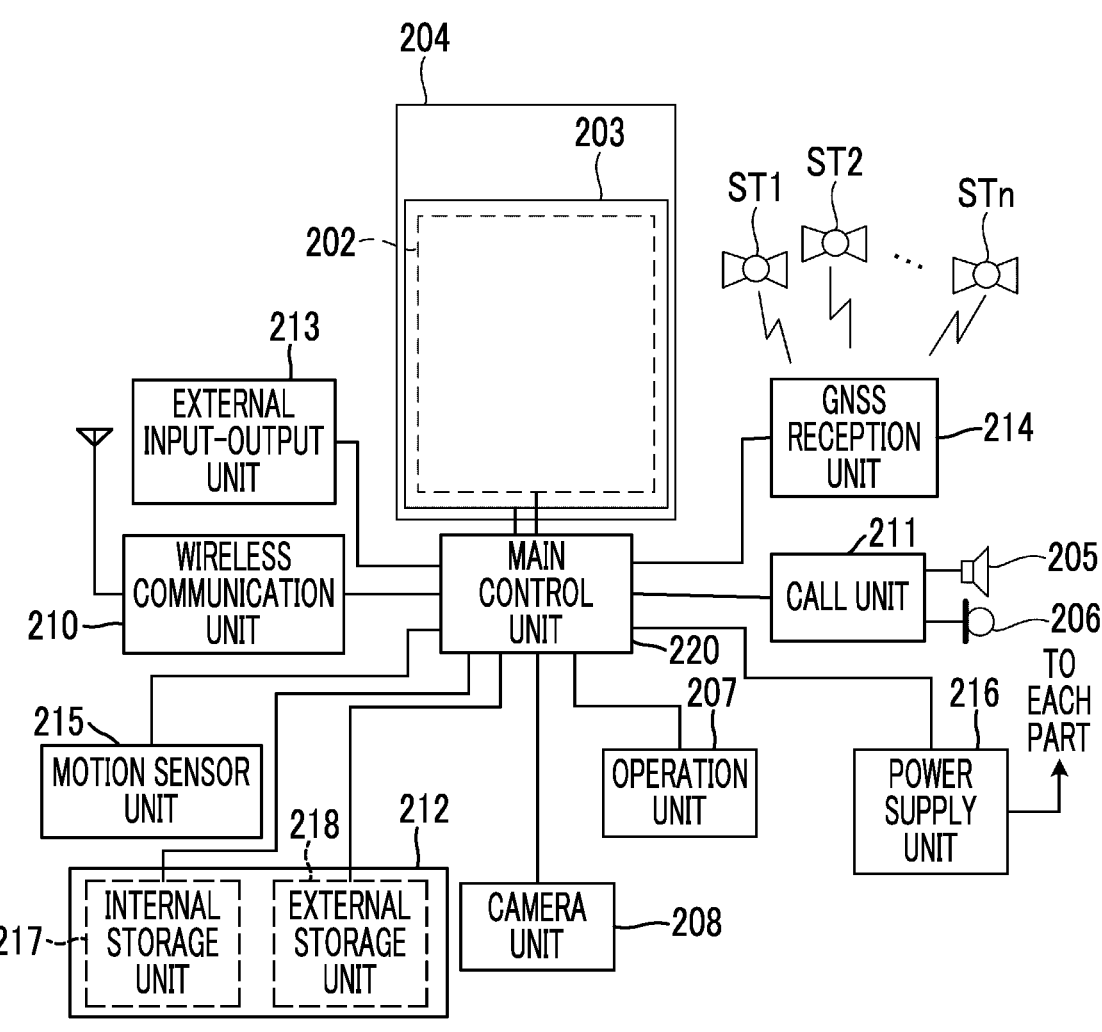
FIG. 8 is a block diagram illustrating a configuration of the smartphone 200 illustrated in FIG. 7.

FIG. 8 is a block diagram illustrating a configuration of the smartphone 200 illustrated in FIG. 7.

As illustrated in FIG. 8, a wireless communication unit 210, the display and input unit 204, a call unit 211, the operation unit 207, the camera unit 208, a storage unit 212, an external input-output unit 213, a global navigation satellite system (GNSS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with instructions from the main control unit 220.

By using the wireless communication, transmission and reception of various file data such as audio data and image data, electronic mail data, or the like and reception of web data, streaming data, or the like are performed.

The display and input unit 204 is a so-called touch panel that visually delivers information to the user by displaying images (still images and video images), text information, or the like and that detects a user operation with respect to the displayed information under control of the main control unit 220. The display and input unit 204 comprises the display panel 202 and the operation panel 203.

A liquid crystal display (LCD), an organic electro-luminescence display (OELD), or the like is used as a display device in the display panel 202.

The operation panel 203 is a device that is placed such that an image displayed on a display surface of the display panel 202 can be visually recognized, and that detects one or a plurality of coordinates operated with a finger of the user or with a stylus. In a case where the device is operated with the finger of the user or with the stylus, a detection signal generated by the operation is output to the main control unit 220. Next, the main control unit 220 detects an operation position (coordinates) on the display panel 202 based on the received detection signal.

As illustrated in FIG. 8, while the display panel 202 and the operation panel 203 of the smartphone 200 illustrated as an embodiment of the imaging apparatus according to the present invention are integrated to constitute the display and input unit 204, the operation panel 203 is disposed to completely cover the display panel 202.

In a case where such disposition is employed, the operation panel 203 may have a function of detecting the user operation even in a region outside the display panel 202. In other words, the operation panel 203 may comprise a detection region (hereinafter, referred to as a display region) for an overlapping part overlapping with the display panel 202 and a detection region (hereinafter, referred to as a non-display region) for an outer edge part, other than the overlapping part, that does not overlap with the display panel 202.

A size of the display region and a size of the display panel 202 may completely match, but both sizes do not need to match. In addition, the operation panel 203 may comprise two sensitive regions of the outer edge part and an inner part other than the outer edge part. Furthermore, a width of the outer edge part is appropriately designed depending on a size and the like of the casing 201.

Furthermore, examples of a position detection system employed in the operation panel 203 include a matrix switch system, a resistive membrane system, a surface acoustic wave method, an infrared method, an electromagnetic induction method, and a capacitance method, and any system can be employed.

The call unit 211 comprises the speaker 205 or the microphone 206, and converts voice of the user input through the microphone 206 into audio data processable in the main control unit 220 and outputs the audio data to the main control unit 220, or decodes audio data received by the wireless communication unit 210 or by the external input-output unit 213 and outputs the decoded audio data from the speaker 205.

In addition, as illustrated in FIG. 7, for example, the speaker 205 can be mounted on the same surface as a surface on which the display and input unit 204 is provided, and the microphone 206 can be mounted on a side surface of the casing 201.

The operation unit 207 is a hardware key that uses a key switch or the like, and receives instructions from the user. For example, as illustrated in FIG. 7, the operation unit 207 is a push button-type switch that is mounted on a side surface of the casing 201 of the smartphone 200 and that is set to an ON state in a case where the switch is pressed with the finger or the like, and is set to an OFF state by restoring force of a spring or the like in a case where the finger is released.

In the storage unit 212, a control program and control data of the main control unit 220, application software, address data in which a name, a telephone number, or the like of a communication counterpart is associated, transmitted and received electronic mail data, web data downloaded by web browsing, and downloaded contents data are stored, and streaming data or the like is temporarily stored. In addition, the storage unit 212 is configured with an internal storage unit 217 incorporated in the smartphone and with an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 functions as an interface with all external apparatuses connected to the smartphone 200 and is directly or indirectly connected to other external apparatuses by communication or the like (for example, a universal serial bus (USB), IEEE1394, Bluetooth (registered trademark), radio frequency identification (RFID), infrared communication (Infrared Data Association (IrDA) (registered trademark)), Ultra Wideband (UWB) (registered trademark), or ZigBee (registered trademark)) or through a network (for example, Ethernet (registered trademark) or a wireless local area network (LAN)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone connected in a wired/wireless manner.

The external input-output unit 213 can deliver data transferred from the external apparatuses to each constituent in the smartphone 200 or transfer data in the smartphone 200 to the external apparatuses.

The GNSS reception unit 214 receives GNSS signals transmitted from GNSS satellites ST1 to STn, executes positioning computation processing based on the received plurality of GNSS signals, and detects a position consisting of a latitude, a longitude, and an altitude of the smartphone 200 in accordance with instructions from the main control unit 220. In a case where positional information can be acquired from the wireless communication unit 210 or from the external input-output unit 213 (for example, a wireless LAN), the GNSS reception unit 214 can detect the position using the positional information.

The motion sensor unit 215 comprises, for example, a three-axis acceleration sensor and detects a physical motion of the smartphone 200 in accordance with instructions from the main control unit 220. By detecting the physical motion of the smartphone 200, a movement direction or acceleration of the smartphone 200 is detected. A detection result is output to the main control unit 220.

The power supply unit 216 supplies power stored in a battery (not illustrated) to each part of the smartphone 200 in accordance with instructions from the main control unit 220.

The main control unit 220 comprises a microprocessor, operates in accordance with the control program and with the control data stored in the storage unit 212, and manages and controls each part of the smartphone 200. In addition, the main control unit 220 has a mobile communication control function of controlling each part of a communication system and an application processing function in order to perform voice communication or data communication through the wireless communication unit 210.

The application processing function is implemented by operating the main control unit 220 in accordance with the application software stored in the storage unit 212. For example, the application processing function is an infrared communication function of performing data communication with counter equipment by controlling the external input-output unit 213, an electronic mail function of transmitting and receiving electronic mails, or a web browsing function of viewing a web page.

In addition, the main control unit 220 has an image processing function such as displaying an image on the display and input unit 204 based on image data (data of a still image or of a video image) such as reception data or downloaded streaming data.

The image processing function refers to a function of causing the main control unit 220 to decode the image data, perform image processing on the decoding result, and display the image on the display and input unit 204.

Furthermore, the main control unit 220 executes a display control of the display panel 202 and an operation detection control of detecting user operations performed through the operation unit 207 and through the operation panel 203.

By executing the display control, the main control unit 220 displays an icon for starting the application software or for a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation performed through the operation unit 207, receives an operation with respect to the icon and an input of a text string in an input field of the window through the operation panel 203, or receives a request for scrolling the display image made through the scroll bar.

Furthermore, by executing the operation detection control, the main control unit 220 is provided with a touch panel control function of determining whether the operation position on the operation panel 203 is in the overlapping part (display region) overlapping with the display panel 202 or is in the other outer edge part (non-display region) not overlapping with the display panel 202 and of controlling the sensitive region of the operation panel 203 or a display position of the software key.

In addition, the main control unit 220 can detect a gesture operation with respect to the operation panel 203 and execute a function set in advance in accordance with the detected gesture operation.

The gesture operation is not a simple touch operation in the related art and means an operation of drawing a path with the finger or the like, designating a plurality of positions at the same time, or as a combination thereof, drawing a path from at least one of the plurality of positions.

The camera unit 208 includes configurations other than the external memory control unit 20, the storage medium 21, the display control unit 22, the display device 23, and the operation unit 14 in the digital camera illustrated in FIG. 1.

Captured image data generated by the camera unit 208 can be stored in the storage unit 212 or be output through the external input-output unit 213 or through the wireless communication unit 210.

In the smartphone 200 illustrated in FIG. 7, the camera unit 208 is mounted on the same surface as the display and input unit 204. However, a mount position of the camera unit 208 is not limited thereto. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as an operation input of the operation panel 203.

In addition, in detecting the position via the GNSS reception unit 214, the position can be detected by referring to the image from the camera unit 208. Furthermore, by referring to the image from the camera unit 208, it is possible to determine an optical axis direction of the camera unit 208 of the smartphone 200 or to determine the current use environment without using the three-axis acceleration sensor or by using the three-axis acceleration sensor together. The image from the camera unit 208 can also be used in the application software.

In addition, image data of a still image or of a video image to which the positional information acquired by the GNSS reception unit 214, voice information (may be text information acquired by performing voice to text conversion via the main control unit or the like) acquired by the microphone 206, posture information acquired by the motion sensor unit 215, or the like is added can be stored in the storage unit 212 or be output through the external input-output unit 213 or through the wireless communication unit 210.

Even in the smartphone 200 having the above configuration, the main subject can be detected with high frequency.

The embodiment of the processing apparatus is not limited to an imaging apparatus such as a digital camera or a smartphone and may be an apparatus including a processor that can execute the processing program executed by the system control unit 11. For example, a processor of a personal computer connected to a surveillance camera through a network may acquire frames of video data captured by the surveillance camera, execute the detection processing of the main subject in which the subject detection processing and the tracking processing are combined, and perform processing corresponding to the detection result (for example, analysis or storage of the area of the main subject).

As described so far, at least the following matters are disclosed in the present specification. While corresponding constituents and the like in the embodiment are shown in parentheses, the present invention is not limited thereto.

(1) A processing apparatus (the digital camera 100) comprising a processor (the processor of the system control unit 11), and a memory (the memory of the system control unit 11), in which the processor is configured to perform first detection processing (the subject detection processing) of detecting a first area of a target to be detected from image data (the detection image data) acquired from an imaging element (the imaging element 5), second detection processing (the tracking processing) of detecting a second area based on the first area from image data acquired from the imaging element, first processing (the display processing of the detection frame image, the focus control, the exposure control, and the white balance control) using the first area detected by the first detection processing, and second processing (the display processing of the detection frame image, the focus control, the exposure control, and the white balance control) using the second area detected by the second detection processing, and the processor is configured to repeatedly perform the first detection processing, and perform the second detection processing in each period from the detecting of the first area by the first detection processing started at a first timing to the detecting of the first area by the first detection processing subsequently started after the first timing.

(2) The processing apparatus according to (1), in which the processor is configured to, after the first detection processing ends, perform the second detection processing with respect to image data acquired after the image data used in the first detection processing.

(3) The processing apparatus according to (1) or (2), in which the processor is configured to, based on an end timing of the first detection processing, control the number of times of the second processing performed between two continuous executions of the first processing.

(4) The processing apparatus according to (3), in which the processor is configured to cause the second processing based on a result of the second detection processing to not operate in a case where the end timing of the first detection processing is earlier than an end timing of the second detection processing with respect to image data acquired before the image data used in the first detection processing.

(5) The processing apparatus according to any one of (1) to (4), in which the processor is configured to continuously perform the second detection processing in a case where the first detection processing is caused to not operate after the first detection processing is performed.

(6) The processing apparatus according to (5), in which the processor is configured to, in a case of continuously performing the second detection processing, perform the second processing using the second area in a case where a reliability degree of the second area detected by the second detection processing is greater than or equal to a threshold value.

(7) The processing apparatus according to any one of (1) to (6), in which the first processing is processing of outputting an image (the detection frame image) based on the first area detected by the first detection processing, and the first area and the second area detected before the first detection processing, and the second processing is processing of outputting an image (the detection frame image) based on the second area detected by the second detection processing, and the first area and the second area detected before the second detection processing.

(8) The processing apparatus according to (7), in which each of the first processing and the second processing is processing of displaying the image on a display device.

(9) The processing apparatus according to any one of (1) to (8), in which a frequency with which the first detection processing is performed is determined based on a time required for the first detection processing.

(10) The processing apparatus according to any one of (1) to (9), in which a time required for the first detection processing is longer than a time required for the second detection processing.

(11) A processing method comprising performing first detection processing of detecting a first area of a target to be detected from image data acquired from an imaging element, second detection processing of detecting a second area based on the first area from image data acquired from the imaging element, first processing using the first area detected by the first detection processing, and second processing using the second area detected by the second detection processing, wherein the first detection processing is repeatedly performed, and the second detection processing is performed in each period from the detecting of the first area by the first detection processing started at a first timing to the detecting of the first area by the first detection processing subsequently started after the first timing.

(12) The processing method according to (11), in which after the first detection processing ends, the second detection processing with respect to image data acquired after the image data used in the first detection processing is performed.

(13) The processing method according to (11) or (12), in which based on an end timing of the first detection processing, the number of times of the second processing performed between two continuous executions of the first processing is controlled.

(14) The processing method according to (13), in which the second processing based on a result of the second detection processing is caused to not operate in a case where the end timing of the first detection processing is earlier than an end timing of the second detection processing with respect to image data acquired before the image data used in the first detection processing.

(15) The processing method according to any one of (11) to (14), in which the second detection processing is continuously performed in a case where the first detection processing is caused to not operate after the first detection processing is performed.

(16) The processing method according to (15), in which in a case of continuously performing the second detection processing, the second processing using the second area is performed in a case where a reliability degree of the second area detected by the second detection processing is greater than or equal to a threshold value.

(17) The processing method according to any one of (11) to (16), in which the first processing is processing of outputting an image based on the first area detected by the first detection processing, and the first area and the second area detected before the first detection processing, and the second processing is processing of outputting an image based on the second area detected by the second detection processing, and the first area and the second area detected before the second detection processing.

(18) The processing method according to (17), in which each of the first processing and the second processing is processing of displaying the image on a display device.

(19) The processing method according to any one of (11) to (18), in which a frequency with which the first detection processing is performed is determined based on a time required for the first detection processing.

(20) The processing method according to any one of (11) to (19), in which a time required for the first detection processing is longer than a time required for the second detection processing.

(21) A processing program causing a processor to execute first detection processing of detecting a first area of a target to be detected from image data acquired from an imaging element, second detection processing of detecting a second area based on the first area from image data acquired from the imaging element, first processing using the first area detected by the first detection processing, and second processing using the second area detected by the second detection processing, and furthermore, wherein the processor is caused to repeatedly perform the first detection processing and perform the second detection processing in each period from the detecting of the first area by the first detection processing started at a first timing to the detecting of the first area by the first detection processing subsequently started after the first timing.

While various embodiments have been described above with reference to the drawings, the present invention is, of course, not limited to such examples. It is apparent that those skilled in the art may perceive various modification examples or correction examples within the scope disclosed in the claims, and those examples are also understood as falling within the technical scope of the present invention. In addition, each constituent in the embodiment may be arbitrarily combined without departing from the gist of the invention.

The present application is based on Japanese Patent Application (JP2021-005137) filed on Jan. 15, 2021, the content of which is incorporated in the present application by reference.

EXPLANATION OF REFERENCES

1: imaging lens
2: stop
4: lens control unit
5: imaging element
6: analog signal processing unit
7: analog-to-digital conversion circuit
8: lens drive unit
9: stop drive unit
10: imaging element drive unit
11: system control unit
14: operation unit
15: memory control unit
16: main memory
17: digital signal processing section
20: external memory control unit
21: storage medium
22: display control unit
23: display device
24: control bus
25: data bus
40: lens device
T11, T12, T13, T14: period
T21, T22, T23: period
T31, T32, T33, T34: period
T31a, T32a, T33a: period
T41, T42, T43: period
T41a, T42a, T43a: period
T51, T52, T53, T54: period
T61: period
200: smartphone
201: casing
202: display panel
203: operation panel
204: display and input unit
205: speaker
206: microphone
207: operation unit
208: camera unit
210: wireless communication unit
211: call unit

212: storage unit
213: external input-output unit
214: GNSS reception unit
215: motion sensor unit
216: power supply unit
217: internal storage unit
218: external storage unit
220: main control unit
ST1 to STn: GNSS satellite

What is claimed is:

1. A processing apparatus comprising:
a processor; and
a memory,
wherein the processor is configured to perform:
 first detection processing of detecting a first area of a target to be detected from image data acquired from an imaging element;
 second detection processing of detecting a second area based on the first area from image data acquired from the imaging element;
 first processing using the first area detected by the first detection processing; and
 second processing using the second area detected by the second detection processing,
the processor is configured to repeatedly perform the first detection processing, and perform the second detection processing in each period from the detecting of the first area by the first detection processing started at a first timing to the detecting of the first area by the first detection processing subsequently started after the first timing,
the processor is configured to, based on an end timing of the first detection processing, control number of times of the second processing performed between two continuous executions of the first processing, and
the processor is configured to cause the second processing based on a result of the second detection processing to not operate in a case where the end timing of the first detection processing is earlier than an end timing of the second detection processing to image data acquired before the image data used in the first detection processing.

2. The processing apparatus according to claim 1,
wherein the processor is configured to, after the first detection processing ends, perform the second detection processing to image data acquired after the image data used in the first detection processing.

3. The processing apparatus according to claim 1,
wherein the processor is configured to continuously perform the second detection processing in a case where the first detection processing is caused to not operate after the first detection processing is performed.

4. The processing apparatus according to claim 3,
wherein the processor is configured to, in a case of continuously performing the second detection processing, perform the second processing using the second area in a case where a reliability degree of the second area detected by the second detection processing is greater than or equal to a threshold value.

5. The processing apparatus according to claim 1,
wherein the first processing is processing of outputting an image based on the first area detected by the first detection processing, and the first area and the second area detected before the first detection processing, and
the second processing is processing of outputting an image based on the second area detected by the second detection processing, and the first area and the second area detected before the second detection processing.

6. The processing apparatus according to claim 5,
wherein each of the first processing and the second processing is processing of displaying the image on a display device.

7. The processing apparatus according to claim 1,
wherein a frequency with which the first detection processing is performed is determined based on a time required for the first detection processing.

8. The processing apparatus according to claim 1,
wherein a time required for the first detection processing is longer than a time required for the second detection processing.

9. A processing method comprising:
performing first detection processing of detecting a first area of a target to be detected from image data acquired from an imaging element, second detection processing of detecting a second area based on the first area from image data acquired from the imaging element, first processing using the first area detected by the first detection processing, and second processing using the second area detected by the second detection processing, wherein
the first detection processing is repeatedly performed, and the second detection processing is performed in each period from the detecting of the first area by the first detection processing started at a first timing to the detecting of the first area by the first detection processing subsequently started after the first timing,
based on an end timing of the first detection processing, number of times of the second processing performed between two continuous executions of the first processing is controlled, and
the second processing based on a result of the second detection processing is caused to not operate in a case where the end timing of the first detection processing is earlier than an end timing of the second detection processing to image data acquired before the image data used in the first detection processing.

10. The processing method according to claim 9,
wherein after the first detection processing ends, the second detection processing to image data acquired after the image data used in the first detection processing is performed.

11. The processing method according to claim 9,
wherein the second detection processing is continuously performed in a case where the first detection processing is caused to not operate after the first detection processing is performed.

12. The processing method according to claim 11,
wherein in a case of continuously performing the second detection processing, the second processing using the second area is performed in a case where a reliability degree of the second area detected by the second detection processing is greater than or equal to a threshold value.

13. The processing method according to claim 9,
wherein the first processing is processing of outputting an image based on the first area detected by the first detection processing, and the first area and the second area detected before the first detection processing, and
the second processing is processing of outputting an image based on the second area detected by the second detection processing, and the first area and the second area detected before the second detection processing.

14. The processing method according to claim 13, wherein each of the first processing and the second processing is processing of displaying the image on a display device.

15. The processing method according to claim 9, wherein a frequency with which the first detection processing is performed is determined based on a time required for the first detection processing.

16. The processing method according to claim 9, wherein a time required for the first detection processing is longer than a time required for the second detection processing.

17. A non-transitory computer readable medium storing a processing program causing a processor to execute first detection processing of detecting a first area of a target to be detected from image data acquired from an imaging element, second detection processing of detecting a second area based on the first area from image data acquired from the imaging element, first processing using the first area detected by the first detection processing, and second processing using the second area detected by the second detection processing, wherein the processor is caused to repeatedly perform the first detection processing and perform the second detection processing in each period from the detecting of the first area by the first detection processing started at a first timing to the detecting of the first area by the first detection processing subsequently started after the first timing, based on an end timing of the first detection processing, number of times of the second processing performed between two continuous executions of the first processing is controlled, and the second processing based on a result of the second detection processing is caused to not operate in a case where the end timing of the first detection processing is earlier than an end timing of the second detection processing to image data acquired before the image data used in the first detection processing.

\* \* \* \* \*